United States Patent
Tong

(10) Patent No.: US 11,297,099 B2
(45) Date of Patent: Apr. 5, 2022

(54) REDISPLAY COMPUTING WITH INTEGRATED DATA FILTERING

(71) Applicant: Forcepoint, LLC, Austin, TX (US)

(72) Inventor: Anthony Tong, Herndon, VA (US)

(73) Assignee: Forcepoint, LLC, Austin, TX (US)

(*) Notice: Subject to any disclaimer, the term of this patent is extended or adjusted under 35 U.S.C. 154(b) by 284 days.

(21) Appl. No.: 16/204,277

(22) Filed: Nov. 29, 2018

(65) Prior Publication Data
US 2020/0177627 A1   Jun. 4, 2020

(51) Int. Cl.
| | |
|---|---|
| *H04L 29/06* | (2006.01) |
| *G06F 16/953* | (2019.01) |
| *G06F 21/62* | (2013.01) |
| *G06F 21/64* | (2013.01) |

(52) U.S. Cl.
CPC ........ *H04L 63/1466* (2013.01); *G06F 16/953* (2019.01); *G06F 21/6218* (2013.01); *G06F 21/64* (2013.01); *H04L 63/0457* (2013.01); *H04L 63/10* (2013.01)

(58) Field of Classification Search
CPC . H04L 63/1466; H04L 63/0457; H04L 63/10; G06F 21/6218; G06F 21/64
USPC .......................................................... 726/3
See application file for complete search history.

(56) References Cited

U.S. PATENT DOCUMENTS

| | | | |
|---|---|---|---|
| 7,574,740 B1 | 8/2009 | Kennis | |
| 7,882,538 B1 | 2/2011 | Palmer | |
| 8,230,505 B1 | 7/2012 | Ahrens et al. | |
| 10,521,566 B2 * | 12/2019 | Choi | ........................ H04L 63/10 |
| 2002/0078382 A1 | 6/2002 | Sheikh et al. | |
| 2003/0145225 A1 | 7/2003 | Bruton et al. | |
| 2003/0145226 A1 | 7/2003 | Bruton et al. | |
| 2003/0188189 A1 | 10/2003 | Desai et al. | |
| 2005/0138402 A1 | 6/2005 | Toon et al. | |
| 2006/0085543 A1 | 4/2006 | Hrastar et al. | |
| 2006/0117172 A1 | 6/2006 | Zhang et al. | |
| 2007/0208813 A1 | 9/2007 | Blagsvedt et al. | |
| 2008/0082722 A1 | 4/2008 | Savagaonkar et al. | |
| 2009/0249466 A1 | 10/2009 | Motil et al. | |
| 2009/0254572 A1 | 10/2009 | Redlich et al. | |
| 2010/0010968 A1 | 1/2010 | Redlich et al. | |
| 2013/0080641 A1 | 3/2013 | Lui et al. | |
| 2013/0085761 A1 | 4/2013 | Bringert et al. | |
| 2013/0231084 A1 | 9/2013 | Raleigh | |

(Continued)

OTHER PUBLICATIONS symantec.com, Which tuning is available for improving the performance of Symantec Endpoint Protection clients during scan, https://support.symantec.com/en_US/article.TECH143941.html, Jan. 6, 2011.

(Continued)

*Primary Examiner* — Longbit Chai
(74) *Attorney, Agent, or Firm* — Terrile, Cannatti & Chambers, LLP; Emmanuel A. Rivera

(57) ABSTRACT

A method, system and computer-usable medium for redisplaying data at a remote access client system from a secure computing environment. The redisplaying data includes receiving a request form the remote access client system for data, inspecting the request for potential unauthorized or malicious retransmission. Modifying the data, by filtering audio data or transforming graphical data prior to sending the requested data is performed to prevent the unauthorized or malicious retransmission.

20 Claims, 5 Drawing Sheets

(56) References Cited

U.S. PATENT DOCUMENTS

| | | |
|---|---|---|
| 2013/0275574 A1 | 10/2013 | Hugard, IV et al. |
| 2013/0298192 A1 | 11/2013 | Kumar et al. |
| 2014/0198958 A1 | 7/2014 | Nathan et al. |
| 2015/0066896 A1 | 3/2015 | Davis et al. |
| 2015/0261969 A1 | 9/2015 | Frost |
| 2016/0042179 A1 | 2/2016 | Weingarten et al. |
| 2016/0055334 A1 | 2/2016 | Herwono et al. |
| 2016/0148019 A1 | 5/2016 | Rambler et al. |
| 2017/0126718 A1 | 5/2017 | Baradaran et al. |
| 2017/0149795 A1 | 5/2017 | Day, II |
| 2017/0214705 A1 | 7/2017 | Gupta |
| 2017/0244729 A1 | 8/2017 | Fahrny et al. |
| 2017/0302822 A1 | 10/2017 | Vandeweerd et al. |
| 2017/0329966 A1 | 11/2017 | Koganti et al. |
| 2019/0034625 A1 | 1/2019 | Ford et al. |
| 2019/0124117 A1 | 4/2019 | Swafford |
| 2019/0124118 A1 | 4/2019 | Swafford |
| 2020/0134192 A1 | 4/2020 | Gupta et al. |
| 2020/0234243 A1 | 7/2020 | Miron et al. |
| 2020/0242260 A1 | 7/2020 | Chen et al. |
| 2020/0257821 A1 | 8/2020 | Lai |
| 2020/0257822 A1 | 8/2020 | Ford et al. |
| 2020/0257823 A1 | 8/2020 | Ford et al. |

OTHER PUBLICATIONS microsoft.com, Windows Search Overview, https://msdn.microsoft.com/en-us/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS ONE 12(2): e0170579, 2017.

SANS ISC InfoSec Forums, Tool to Detect Active Phishing Attacks Using Unicode Look-Alike Domains, https://isc.sans.edu/forums/diary/Tool+to+Detect+Active+Phishing+Attacks+Using+Unicode+LookAlike+Domains/22310/, downloaded Nov. 1, 2018.

* cited by examiner

REDISPLAY COMPUTING WITH INTEGRATED DATA FILTERING

BACKGROUND OF THE INVENTION

Field of the Invention

The present invention relates in general to the field of computers and similar technologies, and in particular to software utilized in this field. More particularly, the present invention relates to a method, system and computer-usable medium for secure remote network access to computing applications.

Description of the Related Art

Users remotely access computing platforms and computing applications. In general, redisplay refers to software applications being run remotely on another system whose display and controls are used on a separate client system. Redisplay mechanisms may be used to provide users network access to remote computing applications.

Remote access technology primarily allows access to centralized computing resources, remote administration of systems, enhanced ease of use or performance, and provide availability on remote platforms. However, remote access technology lacks the ability to provide inline, integrated ability to inspect, validate, and transform data streams used in redisplay. In particular, such remote access does not provide implementation of schemes to disrupt unauthorized and/or malicious data that is transmitted. Generally, in remote access technology, solutions for data protection is applied around the network transport used to redisplay data streams, and not the content itself.

SUMMARY OF THE INVENTION

A method, system and computer-usable medium for secure remote network access to computing applications via a redisplay mechanism that has ability to prevent infiltration and/or exfiltration of unauthorized data. For redisplay capabilities, integrated filtering of network data is provided. Inspection and filtering is provided to prevent unauthorized data transfer data transfer, and provide an overall secure infrastructure that minimizes ability for malicious data to be used to attack the system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium for analyzing, filtering, and transforming redisplay data to prevent unauthorized infiltration or exfiltration of data. Certain aspects of the invention provide for verification, inspection, auditing and transformation of data to prevent unauthorized transmission by users.

For the purposes of this disclosure, a remote access client system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a remote access client system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The remote access client system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The remote access client system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
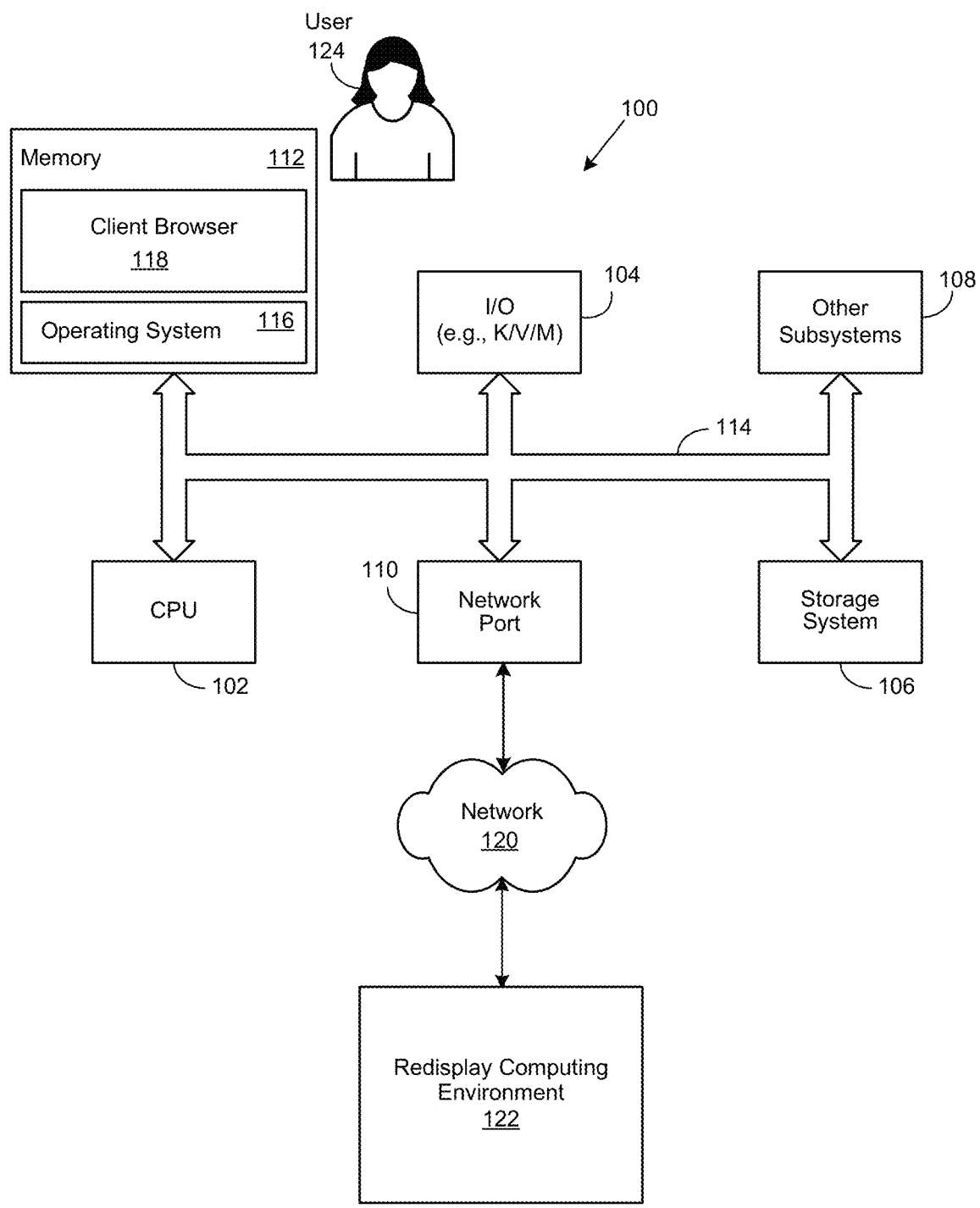
FIG. 1 is a block diagram of remote access client system.

FIG. 1 is a generalized illustration of remote access client system 100 that can be used to implement the system and method of the present invention. The remote access client system 100 includes a processor (e.g., central processor unit or "CPU") 102, input/output (I/O) devices 104, such as a keyboard, a display (video), a mouse, and associated controllers, a storage system 106, and various other subsystems 108. In various embodiments, the remote access client system 100 also includes a network port 110. The remote access client system 100 likewise includes system memory 112, which is interconnected to the foregoing via one or more buses 114. System memory 112 further includes operating system (OS) 116, and in various embodiments also include a web browser or client browser 118. As an example, client browser 118 may include one or more particular web browsers, such as Chrome™, Firefox™, Edge™ browsers, etc. The client browser 118 may further include mobile web browsers, for example Android™, Chrome™ browsers, etc. The remote access client system 100 is further operable to connect to a network 120, which is likewise accessible by a redisplay computing environment 122. In certain implementations, the remote access client system 100 allows a user 124 to access applications, data, etc. on the redisplay computing environment 122.

Figure 2:
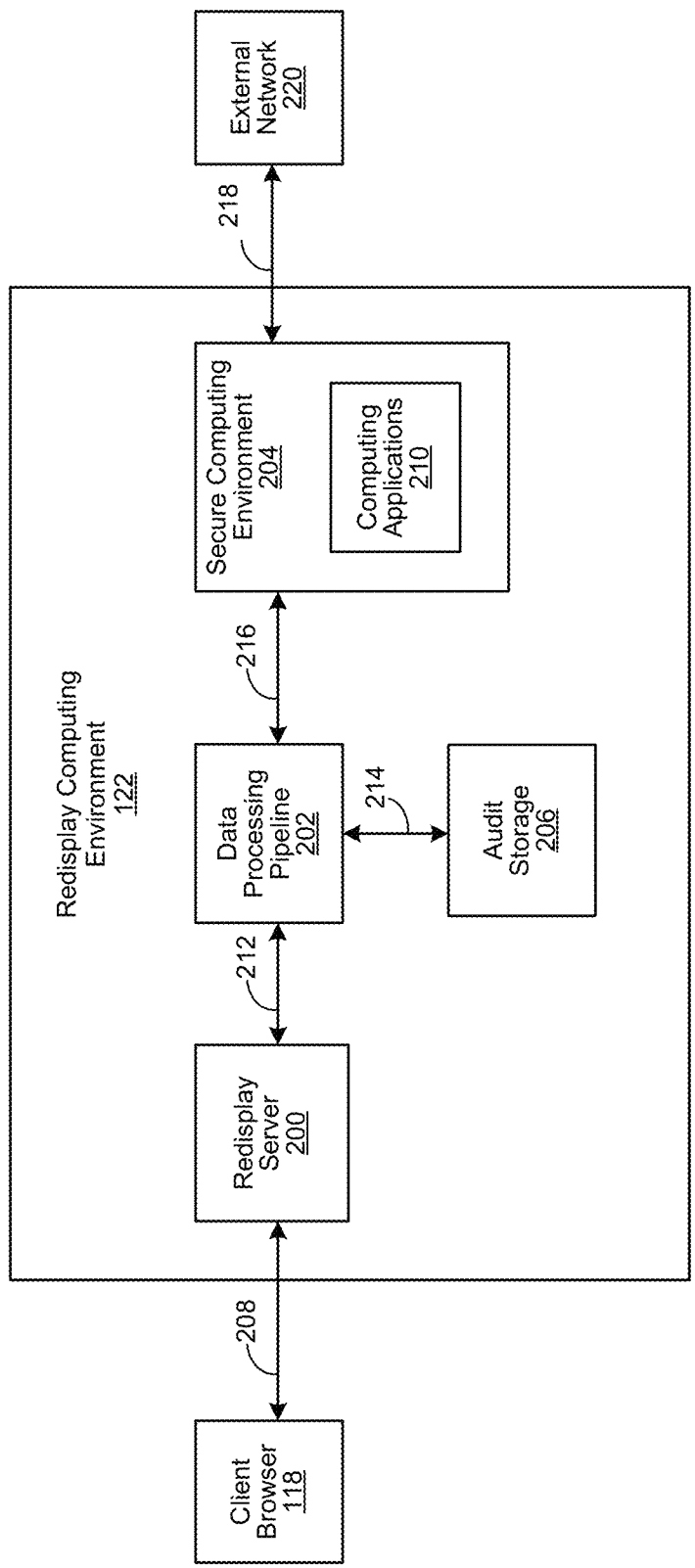
FIG. 2 is a block diagram of a redisplay computing environment.

FIG. 2 is a generalized illustration of a redisplay computing environment 122. In certain implementations, the redisplay computing environment 122 includes a redisplay server 200, a processing pipeline 202, a secure computing environment 204, and an audit storage 206. The redisplay server 200 communicates with various remote access client systems 100.

In certain embodiments, the redisplay server 200 communicates with client browser(s) 118 of remote access client systems 100. In effect, users 124 are able to communicate to the redisplay server 200 over various networks, as represented by network 120. Data streams 208 are exchanged between client browser 118 and redisplay server. In certain implementations, a transport, such as HTTPS protocol is used for data streams 208. Such a transport implements intrinsic security properties of privacy, integrity, and authentication. In certain implementations, web browser code, for example HTML 5, is included in the transport used for the data streams 208. In particular, the web browser code includes all the code necessary to use the web browser of client browser 118. Within the transport, the supporting web browser code is used to present the data streams 208 in a usable format to the client browser 118, allowing a user 128 to remotely interact with remote computing applications 210 on the secure computing environment 204. In certain implementations, the redisplay server 200 performs encapsulation and de-capsulation of data streams 208, where the data streams 208 are used for redisplay at remote access client system 100. The redisplay server 200 translates data streams 208 to html/browser files. The data streams 208 may include visual and audio data from remote computing application 210, and input peripheral data such as keyboard and pointer input from the client, into the transport (e.g., HTTPS protocol).

The redisplay server 200 passes (exchanges) data streams 212 to the data processing pipeline 202. The data processing pipeline 202 includes configurable modules that can perform various tasks on the data streams 212. The modules are further discussed below. In certain implementations, the audit storage 206 stores data streams 214 from data processing pipeline 202. The stored data streams 214 in audit storage 206 can be inspected by an authorized user. In certain implementations, machine inspection may be performed on stored data streams 214 in audit storage 206.

In certain embodiments, the data processing pipeline 202 further passes (exchanges) data streams 216 to the secure computing environment 204. As an example, during a user session implementing a minimal desktop environment, such as a Linux™ operating system environment, at remote access client system 100, access to client browser 118 is provided, a user 124 is provided access to protected resources of the redisplay computing environment 122; however, the user 124 does not have the ability to maliciously interfere with redisplay components of the redisplay computing environment 122. It is to be understood that different environments may be implemented.

In the described implementation shown in FIG. 2, for certain implementations, computing applications 210 are run in isolation from another. This may be performed by software mechanisms resident at the secure computing environment 204. In certain implementations, the computing applications 210 further do not have direct access to the data streams 216 between the data processing pipeline 202 and secure computing environment 204. The secure computing environment 204 may include/implement the use of one of several operating systems, such as Linux™ operating system. In certain implementations, the secure computing environment 204 includes a secure redundant computing background, and performs additional processing. The secure computing environment 204 exchanges data streams 218 with an external network 220. The external network 220 may include network 120 of FIG. 1.

Figure 3:
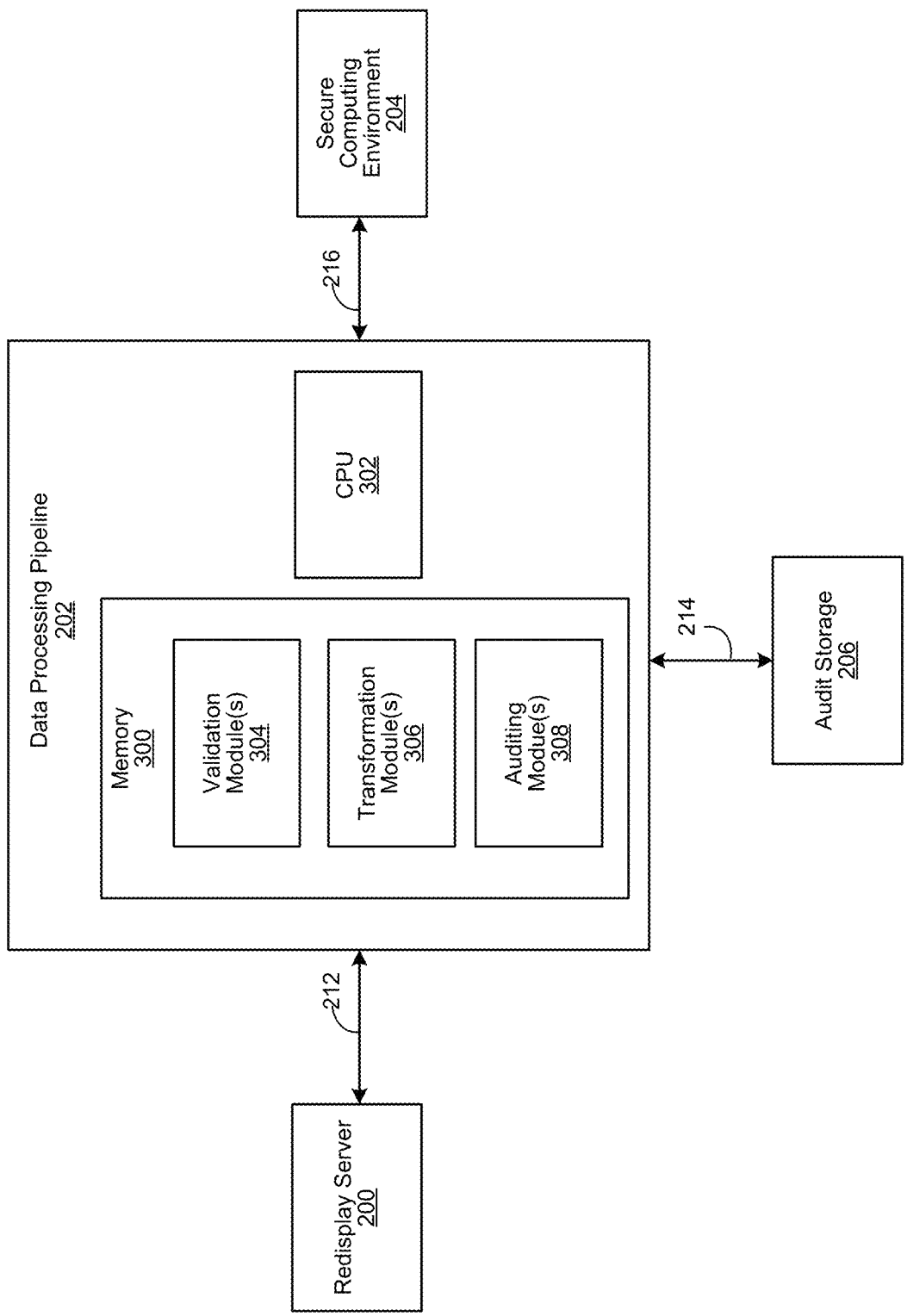
FIG. 3 is a block diagram of a data processing pipeline.

FIG. 3 is a generalized illustration of a data processing pipeline 202. In general, the data processing pipeline 202, as part of the redisplay computing environment 122, is configured to monitor user(s) 124 as the user(s) 124 are looking or accessing data/computer applications 210. If there is suspicion that a user 124 is leaking or sharing data, the redisplay computing environment 122 through the data processing pipeline 202 can hide or disrupt data that is sent by the user 124. The data processing pipeline 202 is designed to provide inline, integrated ability to inspect, validate, and transform data streams used in redisplay. Furthermore, data processing pipeline 202 allows the ability to disrupt unauthorized and/or malicious data that is transmitted.

For the purposes of this disclosure, the data processing pipeline 202 may be consider as a system, and include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. The data processing pipeline 202 may include volatile and/or non-volatile memory 300, and one or more processing resources such as a central processing unit (CPU) 302, processor or hardware or software control logic. Additional components of the data processing pipeline 202 may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The data processing pipeline 202 may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In certain embodiments, the data processing pipeline 202 includes various configurable modules that are used on the data streams (e.g., data stream 212). In other words, the modules are configured to perform certain tasks on the data streams. For certain embodiments, such modules may be included as part of memory 300. In this example, memory 300 includes validation module(s) 304, transformation module(s) 306, and auditing module(s) 308.

Validation module(s) 304 may validate that the data streams (e.g., data stream 212) match an expected data format. For example, if the data stream is graphical data, that the data stream is properly encoded. The validation module(s) 304 can ensure proper that certain data is encoded in a certain manner, and to protecting against potential attack on the data stream and encoding.

Transformation module(s) 306 may alter data streams (e.g., data stream 212) in order to disrupt hidden data embedded in the data stream. Such alteration is not easily perceptible by user(s) 124. Furthermore, such alteration or modification may be subjected to randomness to make the transformation unpredictable. In addition, such transformation may be used to insert watermarks, to indicate the source of the data.

For video transformation, graphical data, in bitmap format, is typically compressed using image compression algorithms, to reduce its size prior to transmission. In certain implementations, the transformation module(s) 306 of the data processing pipeline 202 may be configured to apply lossy image compression, but with a randomized quality setting for each frame transferred. Such transformation makes the resulting data stream unpredictable, but the resulting reconstructed images remain usable by the user. As another example, for audio data, transformation module(s) 306 may also apply randomized frequency filtering and down sampling.

Certain data streams 216 may be passed to/from the secure computing environment 204, where the data streams 216 are converted between data stream format and what the data streams 216 represent in the secure computing environment 204. For example, keyboard input from the remote access client system 100 is translated to native events to be processed by computing applications 210. Graphical data, in bitmap format, is retrieved from the frame buffer (not shown) of the secure computing environment 204. Furthermore in certain implementations, as an optimization, only graphical changes (deltas) are processed, with coordinates included along with the bitmap data. As discussed, in certain embodiments, the secure computing environment 204 hosts the computing applications 210.

Auditing module(s) 308 may selectively record data. In certain implementations, recorded data is stored in audit storage 206. Recording may be performed based particular criteria. Recorded data may be stored in audit storage 206 and archived for subsequent analysis. In other instances, the recorded data or redisplay information may be replayed by authorized user(s). In use cases, auditing modules(s) 308 provide access to users to secure data using web or client browsers 118, and ensure that no protected data can be redisplayed from user(s) 124.

Figure 4:
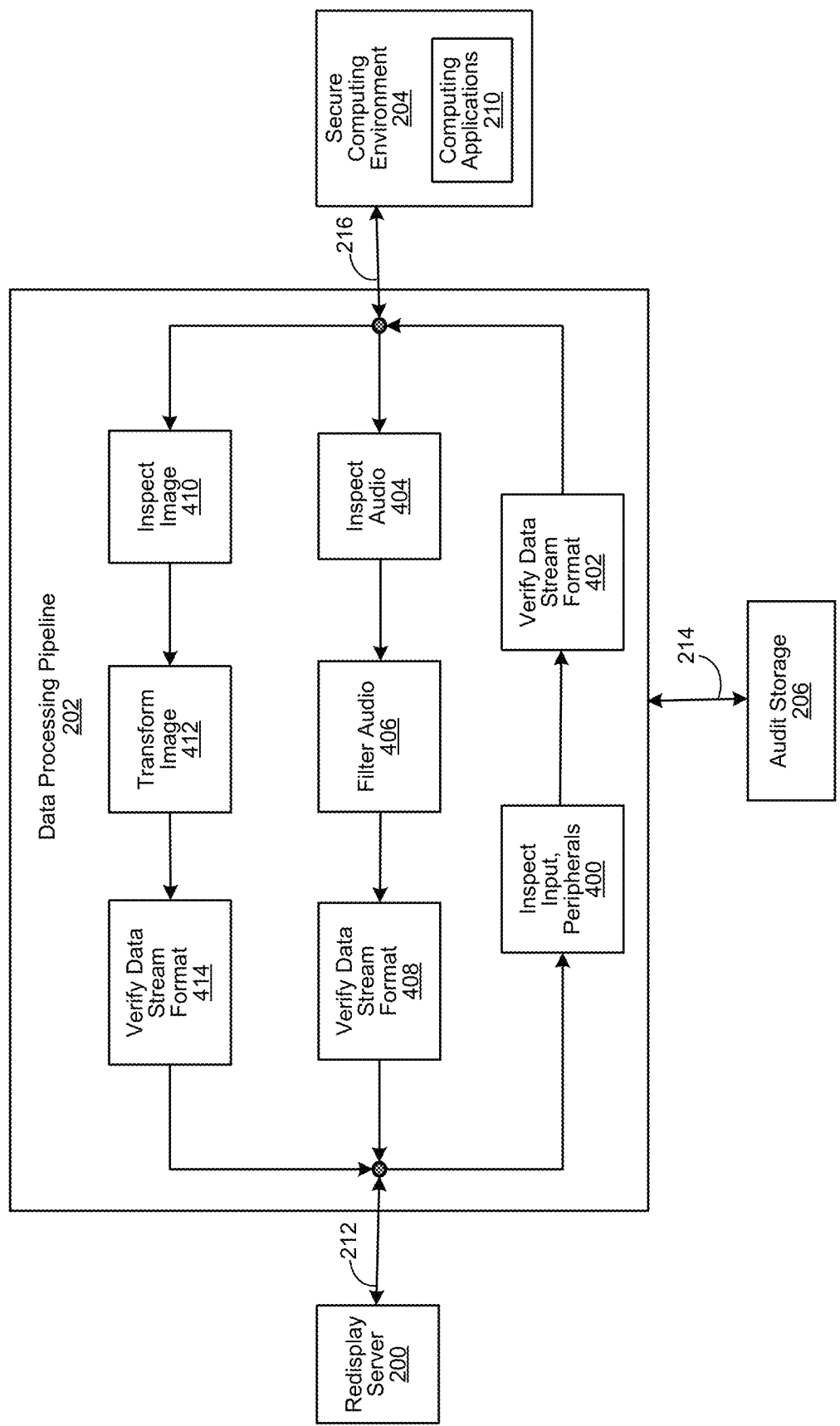
FIG. 4 is a process flow diagram representing a configuration for inspecting, verifying, filtering and transform data streams.

FIG. 4 is a process flow diagram representing a configuration for inspecting, verifying, filtering and transforming data streams. Inputs from the user(s) 124 are received by the data processing pipeline 202 as data streams 212. Inputs may include device inputs from keyboards, pointing devices, etc. from the remoting client access system(s) 100 via web or client browser(s) 118, and further processed by redisplay server 200. Such inputs, in particular, include requests for data and/or access to computing applications 210 resident on secure computing environment 204. In this example, the input and peripherals are inspected at block 400. Inspection may be performed by auditing module(s) 308. In addition, at block 400, the data may be stored in audit storage 206. Auditing on data stored in audit storage 206 may be performed to determine if the input/requests from user(s) 124 is malicious/unauthorized.

Verification of the data stream is performed 402. Validation module(s) 304 may perform such verification. The verified data stream is passed on to the secure computing environment 204 for processing. The secure computing environment 204 provides data streams 216 to the data processing pipeline 202. In the case of audio data, inspection may be performed at block 404. Inspection may be performed by auditing module(s) 308. Filtering of audio data may be performed at block 406. As described above, filtering may be performed by transformation module(s) 306 which may apply randomized frequency filtering and down sampling. At block 408, verification is performed on the filtered data streams. Verification may be performed by validation module(s) 304.

In the case of graphical data, inspection may be performed at block 410. Inspection may be performed by auditing module(s) 308. Transformation of graphical data may be performed at block 412. As described above, transformation of graphical data may be performed by transformation module(s) 306 which may be configured to apply lossy image compression, but with a randomized quality setting for each frame transferred. Such transformation makes the resulting data stream unpredictable, but the resulting reconstructed images remain usable by the user. At block 414, verification is performed on the transformed data streams. Verification may be performed by validation module(s) 304.

Figure 5:
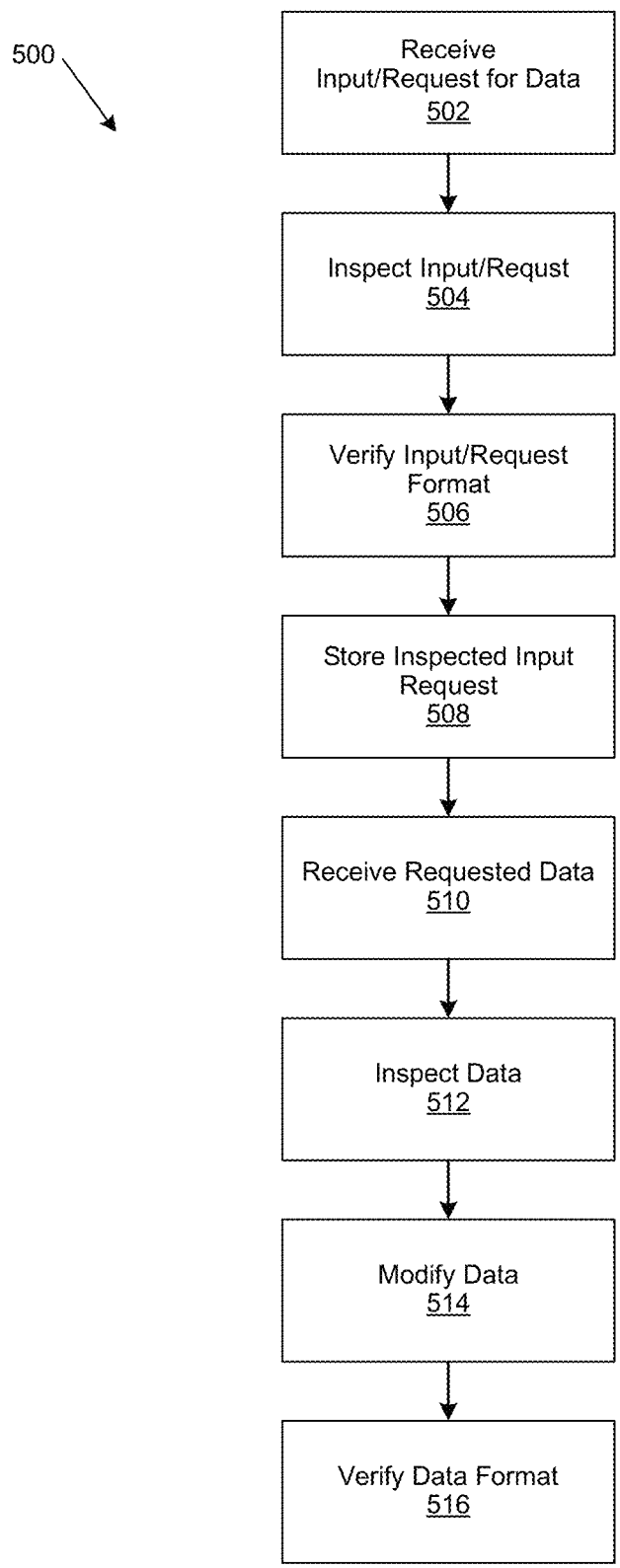
FIG. 5 is a generalized process flow of integrated data filtering in redisplay computing.

FIG. 5 is a generalized process flow 500 of integrated data filtering in redisplay computing. The order in which the process flow is described is not intended to be construed as a limitation, and any number of the described blocks can be combined in any order to implement the process flow. Additionally, individual blocks may be deleted from the process flow without departing from the spirit and scope of the subject matter described herein. Furthermore, the process flow may be implemented in any suitable hardware, software, firmware, or a combination thereof, without departing from the scope of the invention.

At block 502, input and/or requests for data is received. The input/requests may be in the form of data streams which are formatted. In certain implementations, the input/requests are web or client browsers from remote access client systems.

At block 504, inspection or auditing of the input/request is performed. The inspection or auditing may include determining if the requests are for unauthorized or malicious transmission of data.

At block 506, the verifying format of input/request is performed. The verification may be directed to validating if the data stream that includes the input/request in an expected or proper format.

At block 508, the inspected and verified input/request in stored. Selective storing or recording may be performed, and based on particular criteria. Store data may be archived for subsequent analysis.

At block 510, requested data is received. The data may be in the accessing computer applications resident in a secured computing environment.

At block 512, inspection of the data is performed. The inspection or auditing may be performed on graphical or audio data that is redisplayed or transmitted to the remote access client system.

At block 514, modifying the data is performed. Modifying the data may transformation and/or filtering performed on graphical or audio data. The transformation and/or filtering prevents unauthorized or malicious retransmission by remote client system.

At block 516, verification of data format is performed. This verification or validation is directed to determining if the data is formatted properly.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for redisplaying data, comprising:
   receiving at a redisplay computing environment, a data stream from a client browser of a remote access client system, wherein the data stream is used for redisplay at a remote system, wherein the data stream comprises a request for data;
   storing the data stream for inspection at an audit storage of the redisplay computing environment;
   inspecting the data stream at the redisplay computing environment to determine if the data stream is being leaked or shared;
   receiving the data that is requested from a secure computing environment of the redisplay computing environment;
   modifying certain data from the secure computing environment to a different and proper format, wherein the modifying hides or disrupts said certain data that is determined to be leaked or shared;
   sending from the redisplay computing environment, the modified data to the remote access client system;
   verifying at the redisplay computing environment, that the data stream is in the proper format; and
   verifying at the redisplay computing environment that the modified data is in the proper format prior to sending the modified data.

2. The method of claim 1, wherein the received data stream is from the client browser in the remote access client system and a transport is used for the data stream.

3. The method of claim 2, wherein the transport includes code used by a client browser on the remote access client, wherein the client browser provides the request for data and redisplays the data.

4. The method of claim 1, wherein the modifying the data comprises filtering of audio data and transformation of graphical data.

5. The method of claim 1, further comprising:
   storing the inspected data stream for machine inspection.

6. The method of claim 1 wherein the redisplay computing environment comprises a data processing pipeline that performs validation, transformation, and auditing.

7. A system comprising:
a hardware processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
inspecting the data stream at the redisplay computing environment to determine if the data stream is being leaked or shared;
receiving the data that is requested from a secure computing environment of the redisplay computing environment;
modifying certain data from the secure computing environment to a different and proper format, wherein the modifying hides or disrupts said certain data that is determined to be leaked or shared;
receiving the data that is requested from a secure computing environment of the redisplay computing environment;
modifying certain data from the secure computing environment to a different and proper format;
sending from the redisplay computing environment, the modified data to the remote access client system;
verifying at the redisplay computing environment, that the data stream is in the proper format; and
verifying at the redisplay computing environment that the modified data is in the proper format prior to sending the modified data.

8. The system of claim 7, wherein receiving the data stream, which is from a client browser of the remote client system.

9. The system of claim 7, wherein inspecting the data stream comprises determining if the request is for potential unauthorized or malicious retransmission of the data.

10. The system of claim 7, wherein receiving the data is from a secure computing environment.

11. The system of claim 7, wherein the modifying the data comprises filtering of audio data and transformation of graphical data.

12. The system of claim 11, wherein the transformation of graphical data comprises altering data streams of the data in order to disrupt hidden data embedded in the data streams.

13. The system of claim 7, wherein the instructions are further configured for:
verifying that the data stream and data are in an expected data format.

14. A non-transitory, computer-readable storage medium embodying computer program code, the computer program code comprising computer executable instructions configured for:
receiving at a redisplay computing environment, a data stream from a client browser of a remote access client system, wherein the data stream is used for redisplay at a remote system, wherein the data stream comprises a request for data;
storing the data stream for inspection at an audit storage of the redisplay computing environment inspecting the data stream at the redisplay computing environment to determine if the data stream is being leaked or shared;
receiving the data that is requested from a secure computing environment of the redisplay computing environment;
modifying certain data from the secure computing environment to a different and proper format, wherein the modifying hides or disrupts said certain data that is determined to be leaked or shared;
sending from the redisplay computing environment, the modified data to the remote access client system;
verifying at the redisplay computing environment, that the data stream is in the proper format; and
verifying at the redisplay computing environment that the modified data is in the proper format prior to sending the modified data.

15. The non-transitory, computer-readable storage medium of claim 14, wherein the computer executable instructions are further configured for:
verifying data stream and data are encoded in a proper format.

16. The non-transitory, computer-readable storage medium of claim 14, wherein:
the data stream provided in a transport and is from a client browser of a remote access client system.

17. The non-transitory, computer-readable storage medium of claim 14, wherein the computer executable instructions are further configured for:
storing audited data stream.

18. The non-transitory, computer-readable storage medium of claim 14, wherein:
modifying the data comprises filtering of audio data and transformation of graphical data.

19. The non-transitory, computer-readable storage medium of claim 18, wherein transformation of graphical data comprises altering data streams of the data in order to disrupt hidden data embedded in the data streams.

20. The non-transitory, computer-readable storage medium of claim 14, wherein the sending the modified data is through a redisplay server.

* * * * *